Nov. 18, 1969    H. DINGER ETAL    3,478,542
INJECTION MOMENT ADJUSTABLE CONNECTION FOR INJECTION
PUMPS OF INTERNAL COMBUSTION ENGINES
Filed Aug. 15, 1966
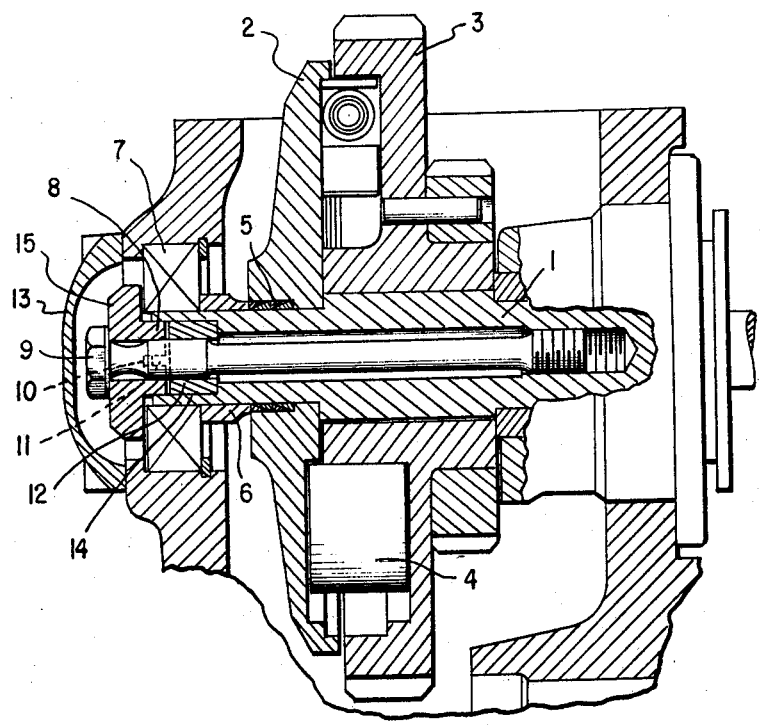
INVENTORS.
HANS DINGER
HERBERT DEUTSCHMANN
BY    ATTORNEYS.

United States Patent Office 3,478,542
Patented Nov. 18, 1969

3,478,542
INJECTION MOMENT ADJUSTABLE CONNECTION FOR INJECTION PUMPS OF INTERNAL COMBUSTION ENGINES
Hans Dinger, Stuttgart, and Herbert Deutschmann, Stuttgart-Bad Cannstatt, Germany, assignors to Daimler-Benz Aktiengesellschaft, Stuttgart-Unterturkheim, Germany
Filed Aug. 15, 1966, Ser. No. 572,251
Claims priority, application Germany, Aug. 17, 1965, D 47,991
Int. Cl. F16d 3/10, 1/08
U.S. Cl. 64—24       10 Claims

ABSTRACT OF THE DISCLOSURE

An injection moment adjustable connection between the engine shaft connected drive gear and the concentric drive shaft for the injection pump, which connection employs ring wedges actuated by a single bolt threaded into the drive shaft. The bolt head is concentric with and immediately adjacent a tool engaging head for rotating the drive shaft during adjustment. Preferably, there is an automatic speed responsive injection adjusting device within the drive gear.

BACKGROUND OF THE INVENTION

It is known to undertake the adjustment of the injection moment at the injection pump coupling. In general, an entrainment sleeve is arranged thereby between the parts to be coupled which is subdivided in the center and is kept together by screws or bolts. These screws are arranged in elongated apertures whereby a rotation of the two halves of the entrainment sleeve with respect to each other is possible. If the basic adjustment of the injection moment has been determined by rotation of the two halves to the entrainment sleeve or bushing, the two screws were tightened and therewith the adjustment was fixed. This method used heretofore, however, is complicated and time-consuming. Additionally, in those cases in which the injection pump is inserted into the center of a V-type engine, it can be carried out only with considerable difficulties. The six screws or bolts distributed over the circumference of the entrainment bushing or sleeve were accessible only with difficulty. Added thereto is the further disadvantage that upon tightening of the bolts or screws a torque had to be exerted which sought to rotate the secondary part of the entrainment sleeve with respect to the primary part whereby the sleeve parts could again be readily rotated with respect to each other and therewith produced an erroneous adjustment.

SUMMARY OF THE INVENTION

It is the aim of the present invention to avoid the aforementioned disadvantages. As solution to the underlying problem, the present invention proposes that a driving member is assembled over or mounted on the drive shaft of the injection pump, with respect to which the drive shaft is rotated during the adjustment of the injection moment whereupon the drive member and drive shaft are coupled with one another.

The adjustability of the injection moment has thus been displaced in accordance with the present invention from the injection pump coupling to the driving member of the shaft driving the injection pump. Hence, it was removed from a place accessible only with difficulty and displaced to the free end face of the engine.

In engines without a spray or injection adjusting device there is used in an appropriate manner as driving member the driving wheel or gear of the injection drive. In engines with a spray or injection adjustment device, the counter-flange of the spray or injection adjustment device may be utilized as driving member. In both cases, the coupling of the driving member and of the drive shaft may take place advantageously by wedge-shaped annular clamping or gripping elements. These wedge-shaped annular clamping or gripping elements are preferably pressed together and retained in operable engagement by means of a bolt adapted to be screwed into the shaft driving the pump by way of intermediate members. The intermediate members utilized therefor are appropriately a first sleeve or bushing mounted upon the shaft and a second sleeve or bushing inserted into an enlarged bore at the shaft edge and provided with a polygonal head projecting laterally beyond the shaft, whereby the second sleeve is provided at its end disposed within the shaft with apertures that are in engagement with projections arranged within the enlarged bore. These projections may be arranged in a simple manner on in insert which is inserted into the enlarged bore and is rigidly connected with the shaft by conventional means. During the adjustment of the injection moment, the drive shaft can be rotated by way of the sleeve inserted into the shaft and having the polygonal head.

BRIEF DESCRIPTION OF THE DRAWING

Accordingly, it is an object of the present invention to provide an adjusting device for adjusting the injection moment in injection pumps of internal combustion engines which avoids the aforementioned shortcomings and drawbacks encountered by the prior art constructions by extremely simple means.

It is another object of the present invention to provide an adjusting mechanism for adjusting the injection moment of injection pumps for internal combustion engines which permits a simple and rapid adjustment of the injection moment without the need of complicated and time-consuming disassemblies and manipulations.

A further object of the present invention resides in an adjusting mechanism for adjusting the injection moment of injection pumps of the type described above which is readily accessible regardless of the type of engine used and which prevents any subsequent misalignments in the final steps after the initial adjustment has been made.

Another object of the present invention is to provide an adjusting mechanism for injection pumps of internal combustion engines which simplifies the over-all adjusting procedure, reduces the steps necessary to carry out the same, and assures easy access to all the parts that need to be adjusted.

These and further objects, features, and advantages of the present invention will become more obvious from the following description when taken in connection with the accompanying drawing which shows, for purposes of illustration only, one embodiment in accordance with the present invention, and wherein:

The single figure is a cross-sectional view through an adjusting device for adjusting the injection moment on a spray or injection adjusting mechanism.

DETAILED DESCRIPTION OF THE DRAWING

Referring now to the drawing, the spray or injection adjusting device of conventional construction consists, in a manner known per se, of the shaft 1, of the counter-flange 2 secured thereon, and of the gear wheel 3 driven from the crankshaft by way of an intermediate gear. The fly-weights 4 are arranged within apertures of the counter-flange 2 and of the gear wheel 3. The counter-flange 2 of the spray or injection adjusting device is not connected with the shaft 1 as customary heretofore by way of a non-adjustable threaded connection, but is connected instead according to this invention with shaft 1 by way of wedge-shaped annular clamping or gripping elements 5 which are pressed together by the screw or bolt 9. A sleeve 6 is displaceably arranged on the shaft 1 and serves like the bearing 7 of conventional construction, which carries the shaft end of the shaft 1, and the polygonal head 15 of the bushing or sleeve 8, as intermediate member between the bolt 9 and the wedge-shaped annular clamping or gripping elements 5. The bolt 9 is threaded into a coaxial thread arranged within the shaft 1. The sleeve 8 is inserted into an enlarged bore 14 of the shaft 1 and is provided at its head 15 with a polygonal enlargement. Furthermore, the end of the sleeve 8 disposed within the shaft 1 is provided with apertures 10 which are in engagement with projections 11. These projections 11 are arranged appropriately on an insert 12 which is inserted into the enlarged bore 14 and is securely connected with the shaft 1 in any conventional manner to rotate in unison therewith. A closure cover 13 is provided for closing off the various parts and protecting the bearing.

The adjustment of the injection moment takes place in that with a loosened bolt 9 and therewith loosened annular clamping or gripping elements 5, the shaft 1 is rotated by means of the sleeve 8 and more particularly for such length of time until a marking accommodated on the surface of the sleeve 8 assumes an approximately vertical position. The shaft 1 rotates together with the sleeve 8 since the apertures 10 and projections 11 form a rigid shaft connection. Thereupon, the sleeve 8 and therewith the shaft 1 is kept in the adjusted position thereof by means of a wrench or the like and the bolt 9 is tightened and the adjustment of the injection moment is fixed thereby. The measures and steps to be undertaken during the adjustment of the injection moment are very simple and can be carried out very rapidly. For purposes of fixing the adjustment, only one central, easily accessible bolt or screw has to be tightened. The flange for securing the counter-flange which is forged onto the drive shaft in the spray or injection adjusting devices customary heretofore is dispensed with by the annular clamping or gripping elements of the present invention whence also in that respect a simplification, reduction of costs and facilitated assembly are achieved. Additionally, the subdivision of the entrainment sleeve of the injection pump coupling may be dispensed with and the wide screw flanges present heretofore at the entrainment sleeve are unnecessary and can be omitted. The rotating mass of the entrainment sleeve thereby becomes considerably smaller and the tendency to knock out the coupling teeth is thereby reduced. Also, the once-determined and fixed adjustment of the injection moment can be readily sealed in that the securing means for the closure cover, necessary anyhow for covering the bearing support, is provided with a seal.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such modifications and changes as are encompassed by the scope of the appended claims.

We claim:

1. A device for manually adjusting the injection moment in an injection pump of an internal combustion engine having an engine shaft, comprising drive shaft means for driving connection with the injection pump, a driving member having means drivingly connecting it to the engine shaft and being mounted on said drive shaft means for relative rotation during the adjustment of the injection moment, and manually disengageable means for rigidly coupling said drive shaft means with said driving member after the adjustment of the injection moment by relative rotation of said driving member with respect to said drive shaft means.

2. A device according to claim 1, wherein said driving member is constituted by the driving gear of the injection pump drive.

3. A device according to claim 1, including an automatic speed responsive injection adjusting device having a counter-flange constituting said driving member.

4. A device according to claim 1, wherein said manually disengageable means coupling the driving member with the drive shaft means includes wedge-shaped annular gripping means between said driving member and said drive shaft means.

5. A device according to claim 4, wherein said manually disengageable means includes threaded means adapted to be threaded into the drive shaft means for pressing together and retaining said wedge-shaped annular gripping means.

6. A device according to claim 5, wherein said threaded means includes a threaded bolt, and several intermediate members operatively connecting said bolt with said wedge-shaped gripping means.

7. A device according to claim 6, wherein said intermediate members include a first sleeve mounted on said shaft means, a second sleeve inserted into an enlarged bore provided at the end of the drive shaft means and having a polygonal head portion projecting laterally beyond the drive shaft means, said second sleeve being provided at its end disposed within the shaft means with apertures, and means forming projections arranged within the enlarged bore for engaging with said apertures.

8. A device according to claim 7, wherein said means forming projections includes an insert member which is inserted into the enlarged bore and is rigidly connected with the shaft means for rotation in unison therewith.

9. A device according to claim 1, wherein said manually disengageable means includes only a single threaded connection having a tool engaging head, and including an adjustment member having a tool engaging head closely adjacent said threaded connection tool engaging head and having a form-locking connection with said drive shaft means rotatable relative to said driving member and said threaded connection to adjust the injection moment upon loosening of said threaded connection.

10. A device according to claim 1, including a housing wall having an opening, a bearing rotatably mounting said drive shaft means in said housing wall opening, said driving member being on one side of said wall, said disengageable means including only a single first tool engaging head on the other side of said wall for operation thereof, a second tool engaging head on the other side of said wall concentric with said first tool engaging head drivingly connected with said drive shaft means for manual rotation thereof.

References Cited
UNITED STATES PATENTS

| | | | |
|---|---|---|---|
| 1,629,252 | 5/1927 | Bouza | 64—24 |
| 2,573,928 | 11/1951 | Peter. | |
| 2,755,093 | 7/1956 | Peter et al. | 287—53 XR |
| 3,112,116 | 11/1963 | Seitz | 287—53 XR |

FOREIGN PATENTS

| | | |
|---|---|---|
| 1,095,064 | 12/1960 | Germany |
| 395,497 | 7/1933 | Great Britain. |

HALL C. COE, Primary Examiner

U.S. Cl. X.R.

287—53